US007983721B2

(12) United States Patent
Ying et al.

(10) Patent No.: US 7,983,721 B2
(45) Date of Patent: Jul. 19, 2011

(54) TRANSPARENT CONDUCTIVE ANTENNA FOR A PORTABLE COMMUNICATION DEVICE

(75) Inventors: Zhinong Ying, Lund (SE); Hong Ding, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 587 days.

(21) Appl. No.: 11/628,282

(22) PCT Filed: Apr. 27, 2005

(86) PCT No.: PCT/EP2005/004497
§ 371 (c)(1), (2), (4) Date: Nov. 30, 2006

(87) PCT Pub. No.: WO2005/119834
PCT Pub. Date: Dec. 15, 2005

(65) Prior Publication Data
US 2007/0287503 A1 Dec. 13, 2007

Related U.S. Application Data

(60) Provisional application No. 60/578,437, filed on Jun. 9, 2004.

(30) Foreign Application Priority Data
Jun. 2, 2004 (EP) .................................... 04013003

(51) Int. Cl.
*H04M 1/00* (2006.01)

(52) U.S. Cl. .................................... 455/575.1; 343/702

(58) Field of Classification Search ............... 455/575.1, 455/566, 575.7; 343/702
See application file for complete search history.

(56) References Cited

U.S. PATENT DOCUMENTS

| | | | | |
|---|---|---|---|---|
| 5,781,155 | A | 7/1998 | Woo et al. | 342/357 |
| 6,273,573 | B1 * | 8/2001 | Abi-Abdallah | 359/609 |
| 6,278,873 | B1 | 8/2001 | Itakura et al. | 455/351 |
| 6,307,512 | B1 * | 10/2001 | Geeraert | 343/702 |
| 6,339,400 | B1 * | 1/2002 | Flint et al. | 343/702 |
| 2003/0197648 | A1 * | 10/2003 | Quinn et al. | 343/702 |
| 2004/0090382 | A1 | 5/2004 | Kushihi et al. | |

FOREIGN PATENT DOCUMENTS

| | | |
|---|---|---|
| CN | 1137324 A | 12/1996 |
| DE | 44 43 596 | 6/1996 |

(Continued)

OTHER PUBLICATIONS

International Preliminary Report on Patentability for PCT/EP2005/004497 dated Jun. 27, 2006.
European Search Report for Application No. 04 013 033.1-2220; Jul. 16, 2007.
Chinese Office Action for Application No, 200580017808.X mailed May 26, 2010.

*Primary Examiner* — Lewis G West
*Assistant Examiner* — David Bilodeau
(74) *Attorney, Agent, or Firm* — Myers Bigel Sibley & Sajovec

(57) ABSTRACT

The present invention relates to a portable communication device and an antenna unit. The device includes a display having a display surface, a transparent non-conductive display window covering the display surface of the display, and an antenna having at least one antenna element, wherein the antenna element is provided as a transparent conductive layer provided on the display cover. With this antenna solution space is freed inside the device for use for other units or for further size reductions. Light passing through the window is furthermore not blocked.

11 Claims, 2 Drawing Sheets

FOREIGN PATENT DOCUMENTS

| | | | | |
|---|---|---|---|---|
| EP | 0 911 906 | | | 4/1999 |
| EP | 1 280 224 | | | 1/2003 |
| EP | 1603101 | A1 | * | 12/2005 |
| GB | 2 390 957 | A | | 1/2004 |

* cited by examiner

TRANSPARENT CONDUCTIVE ANTENNA FOR A PORTABLE COMMUNICATION DEVICE

RELATED APPLICATIONS

The present application is a 35 U.S.C. §371 national phase application of PCT International Application No. PCT/EP2005/004497, having an international filing date of Apr. 27, 2005 and claiming priority to European Patent Application No. 04013003.1, filed Jun. 2, 2004 and U.S. Provisional Application No. 60/578,437 filed Jun. 9, 2004, the disclosures of which are incorporated herein by reference in their entireties. The above PCT International Application was published in the English language and has International Publication No. WO 2005/119834.

TECHNICAL FIELD OF THE INVENTION

The present invention relates to the field of antennas and more particularly to a portable communication device including an in-built antenna as well as an antenna system.

DESCRIPTION OF RELATED ART

There is a trend within the field of portable communicating devices, and especially within the field of mobile phones to have the antenna in-built in the phone itself. The phones are also becoming smaller and smaller, with a need to use the space of the phone as effectively as possible. At the same time the phones have more and more functions and features and therefore also more components provided in them. Because of this alternative antenna placements are interesting to investigate. One such area is the area in front of the display.

If an antenna is to be provided in the front of the display it does however have to be transparent in the visual wavelength area in order to not block the light emitted from the display.

There have in recent years been developed materials that are conducting while at the same time being transparent, where an example of such a material is ITO (Indium Tin Oxide).

It is furthermore known to provide such a material in a display. In this regard see for instance US2002/0152606, which describes providing an antenna made of ITO on a display of a wireless mobile terminal. The ITO layer is here welded to the circuit board where radio signal circuitry are provided.

When providing an antenna on a display there is however one major problem, which has to be overcome and that is that since a display is normally made of a semiconductor, liquid crystal material, it is usually lossy in the radio frequency band, which will cause some energy absorption. The result of providing the antenna on the display will thus lead to energy absorption, which is not advantageous for the antenna efficiency.

There is thus a need for an alternative placing of an antenna, which allows light passing through a window to avoid being blocked.

SUMMARY OF THE INVENTION

The present invention is directed towards solving the problem of providing an antenna, which allows light passing through a transparent element to avoid being blocked.

One object of the present invention is thus to provide a portable communication device having an in-built antenna which allows light passing through a window to avoid being blocked.

According to a first aspect of the present invention, this object is achieved by a portable communication device comprising:

a display having a display surface, a transparent non-conductive display window covering the display surface of the display, and an antenna having at least one antenna element, wherein the antenna element is provided as a transparent conductive layer provided on the display cover.

A second aspect of the present invention is directed towards a portable communication device including the features of the first aspect, further comprising a thin transparent conductive shield for avoiding electromagnetic radiation absorption by the display.

A third aspect of the present invention is directed towards a portable communication device including the features of the second aspect, wherein the shield is made of a transparent conductive material.

A fourth aspect of the present invention is directed towards a portable communication device including the features of the second aspect, wherein the shield is a part of the display.

A fifth aspect of the present invention is directed towards a portable communication device including the features of the first aspect, wherein the display window is provided in the casing of the device.

A sixth aspect of the present invention is directed towards a portable communication device including the features of the first aspect, wherein the antenna element is provided as a patch on at least a part of the window.

A seventh aspect of the present invention is directed towards a portable communication device including the features of the first aspect, wherein at least one antenna element is a PIFA antenna.

An eighth aspect of the present invention is directed towards a portable communication device including the features of the first aspect, wherein at least one antenna element is a patch antenna.

A ninth aspect of the present invention is directed towards a portable communication device including the features of the first aspect, wherein the antenna comprises at least one contact pad to which one antenna element is electrically connected.

A tenth aspect of the present invention is directed towards a portable communication device including the features of the ninth aspect, wherein the antenna element is connected to the contact pad via an insulating binding agent comprising conductive particles.

An eleventh aspect of the present invention is directed towards a portable communication device including the features of the ninth aspect, wherein the antenna element is connected to the contact pad via a resilient element and at least one force applying element arranged to press the antenna element and the contact pad against each other.

A twelfth aspect of the present invention is directed towards a portable communication device including the features of the first aspect, wherein the antenna comprises a capacitive coupling element for obtaining capacitive coupling of the antenna element to a feeding circuit.

A thirteenth aspect of the present invention is directed towards a portable communication device including the features of the first aspect, wherein it is a mobile phone.

Another object of the present invention is to provide an antenna unit that can be used in relation to transparent elements which allows light passing through the transparent element to avoid being blocked.

According to a fourteenth aspect of the present invention, this object is achieved by an antenna unit comprising:

at least one antenna element in the form of a transparent conductive layer and a transparent supporting element on which the antenna element is provided, wherein the antenna element is provided as a transparent conductive layer provided on the transparent supporting element.

A fifteenth aspect of the present invention is directed towards an antenna unit including the features of the fourteenth aspect, wherein the transparent supporting element is a transparent non-conductive display cover covering a display surface of a display.

A sixteenth aspect of the present invention is directed towards an antenna unit including the features of the fourteenth aspect, wherein the transparent supporting element is a window surface.

The invention has the following advantages it saves space within the device, which can be used for other purposes, like more components and other units or a size reduction of the device. Because of the provision of antenna elements in relation to a transparent element such as a window covering a display, it is possible to provide a shield layer in the display, such that radio frequency absorption in the display is avoided. The invention furthermore does not block light passing through the window, which light can include information presented by a display.

It should be emphasized that the term "comprises/comprising" when used in this specification is taken to specify the presence of stated features, integers, steps or components, but does not preclude the presence or addition of one or more other features, Integers, steps, components or groups thereof.

BRIEF DESCRIPTION OF THE DRAWINGS

The present invention will now be described in more detail in relation to the enclosed drawings, In which.

DETAILED DESCRIPTION OF EMBODIMENTS

A portable communication device according to the present invention will now be described in relation to a mobile phone, which is a preferred variation of the invention. The phone is furthermore preferably a so-called stick-type phone, but it can be other types of phones like clamshell phones. The portable communication device can also be another type of device, like a cordless phone, a communication module, a PDA or any other type of portable device communicating with radio waves.

Figure 1:
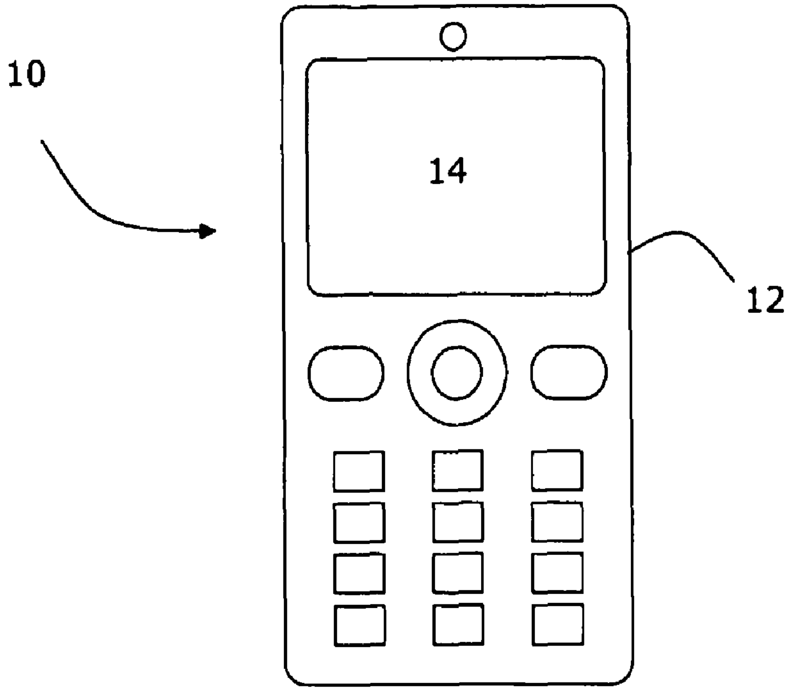
FIG. 1 schematically shows a front view of a portable communication device in the form a mobile phone.

FIG. 1 schematically shows a front view of a phone 10 according to the invention. The phone 10 includes a cover 12 having a number of interface units, like a transparent element in the form of a display window 14 under which a display is provided, a number of keys on a keypad provided below the display window as well as a sound aperture provided above the display window. Here it is worth noting that there is no antenna protruding from the phone. The antenna is in-built.

Figure 2:
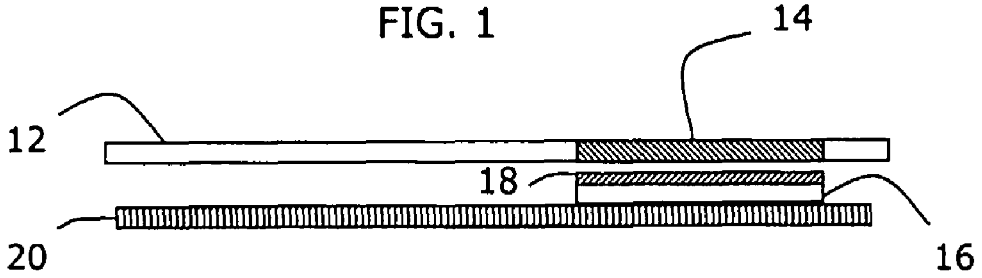
FIG. 2 shows a side view of a cover of the phone and a display provided under it.

FIG. 2 schematically shows a side view of the phone cover 12 provided over a display 16, which display 16 is fastened to a printed circuit board (PCB) 20 for instance by board to board contact. On top of the display 16 there is provided a thin shield layer or film of electrically conducting transparent material 18, which in this example is ITO (Indium Tin Oxide). With this choice of material a transparency of about 90% is obtained with a resistance of less than 20 $\Omega/m^2$. Above the display 16 with the shield layer 18 there is provided a display window 14 made of transparent plastic material. The display 16 has an upper display surface that faces the window 14, such that information can be presented to a user through the window 14. The shield layer is thus provided on the display surface facing the display window 14. In the window 14 an antenna system is provided from the same material as the shield layer. Because of the shield layer 18, radiation to or from the antenna in the window 14 is not absorbed by the display 16, which leads to the antenna being more efficient than if it were to be provided directly on the display. There is preferably provided a gap between the display window 14 and the display 16. The window 14 is here preferably placed about 1 mm over the display. The shield layer 18 could be provided in a front polarizing layer of the display in the way described in the patent application entitled "DISPLAY" by the same applicant and filed simultaneously with the present patent application. The description of that application is herein incorporated by reference. As an alternative the shield can be provided as a separate element provided between display and window.

Figure 3:
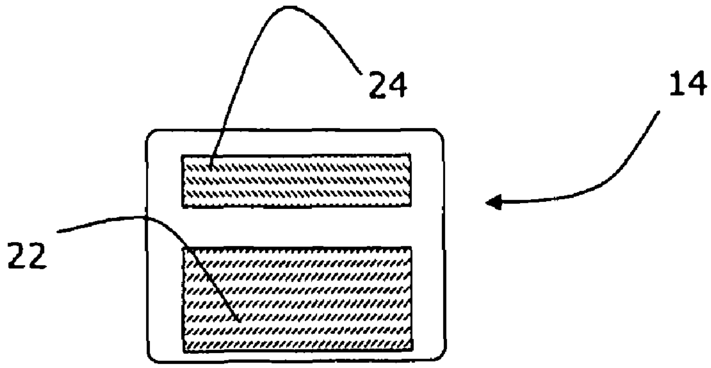
FIG. 3 shows a front view of a display window according to the invention, where two antenna elements are provided, FIG. 4 schematically shows a perspective view of a first antenna element and contact pad in the display window of FIG. 3, FIG. 5 schematically shows a perspective view of a second antenna element and contact pads in the display window of FIG. 3, FIG. 6 schematically shows a side view of a connection of the first antenna element to a contact pad according to a first embodiment of the present invention, FIG. 7 schematically shows a side view of a connection of the first antenna element to a contact pad according to a second embodiment of the present invention.

FIG. 3 shows a front view of the display window 14 where the antenna, in the form of two radiating antenna elements 22 and 24, is provided. The antenna is made in a thin layer or film of transparent conductive material, like ITO. The radiating antenna elements 22 and 24 are thus transparent, but they are indicated with hatching in order to show their presence in the window 14. In the window 14 a first antenna element 22, which is a half wave patch antenna and a second antenna element 24, which is a quarter wave PIFA antenna, are provided. The first antenna element 22 therefore only needs one feeding point while the second antenna element 24 needs two connection points. In the invention these antenna elements are preferably a positioning antenna element, for instance a GPS antenna, and a short length microwave antenna, for instance for use in the Bluetooth™ transmission system. It should however be realised that there need not be provided two antenna elements, but that there can be provided only one or of course more antenna elements, where the design of the antenna elements depend on the desired frequency range used by each element. If the device would be a handheld computer like a PDA, the antenna can also be an RF transmission/reception antenna for instance for use in GSM telephony. An antenna element is here provided as a patch covering a certain area and covering at least a part of the display. With this antenna solution light passing through the window an emanating from the display is not blocked and space within the phone is saved.

Figure 4:
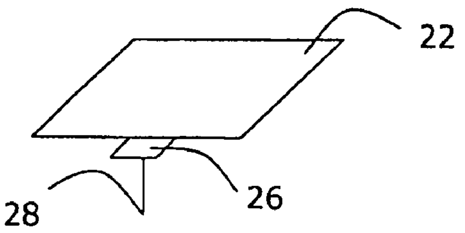
Figure 5:
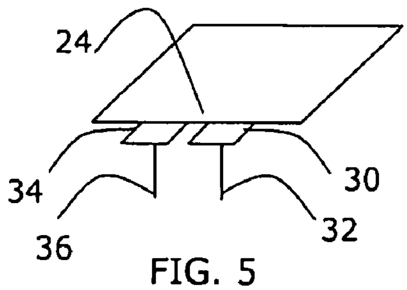

FIG. 4 shows a perspective view of the first antenna element 22 which is provided with a contact pad 26. The pad 26 is connected to a contact pin 28 which is in turn connected to the printed circuit board for receiving a radio signal. In the same way FIG. 5 shows a perspective view of the second antenna element 24, which is provided with a first contact pad 30 that is in a similar way connected to a first contact pin 32 as well as a second contact pad 34 connected to a second contact pin 36. Here the first contact pad 30 receives a radio signal, while the second contact pad 34 receives a ground potential. As mentioned earlier the antenna elements are provided of a suitable electrically conducting transparent material, and in the present case an ITO layer. With this type of material it is hard to achieve a good electrical connection between antenna element and contact pad. This type of material cannot be soldered to the circuit board, which leads to other solutions having to be provided. The present invention is also directed towards providing good electrical connections to these types of materials, where two embodiments will be described in the following.

Figure 6:
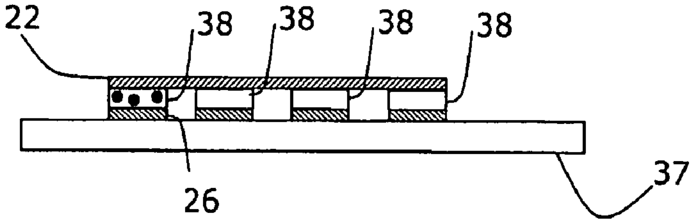

The contacting according to the first embodiment is outlined in FIG. 6, which shows a FPC (flexible printed circuit) 37 in the form of a polyester film which has a layer of conducting material, normally in the form of a copper, and non-conducting material. In this layer the contact pad 26 is provided. The conducting material is provided in stripes so that PFC has the layout of a zebra skin. An insulating binding agent in the form of a suitable anisotropic adhesive comprising conductive particles 38 is painted on a part of the antenna element 22 facing the pad 26. Other parts of the antenna element are fastened by an adhesive 38 without such particles. The particles are preferably metallic and in the present embodiment gold. This ensures good electrical contact to the antenna element 22 in the ITO layer. The FPC 37 is pressed onto the adhesive 38 while applying heat and in this way the pad 26 is well connected to the antenna element 22 in the form of the ITO strip. The FPC 37 is in turn connected to the printed circuit board through a contactor.

Figure 7:
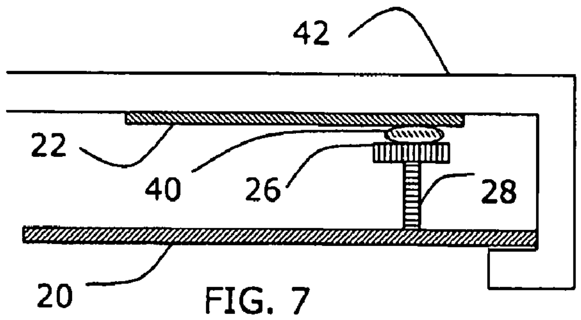

As an alternative contacting can be made using a resilient element and applied force. How this can be done according to a second embodiment of the present invention is shown in FIG. 7, where the ITO layer 22 is provided on the inner side of a long leg of a force applying element in the form of an L-shaped plastic transparent carrier 42. At the opposite side of ITO layer 22 the printed circuit board 20 is provided and forced towards the layer 22 by a ridge provided at the furthest end at a bottom leg of the "L" 42. The contact pin 28 is at one end attached to the board 20 and at another end attached to the pad 26, where the pin 28 is perpendicular to the ITO layer 22. Between the pad 26 and the ITO layer 22 there is provided a soft resilient element 40 in the form of an elastomer, which is depressed by the force applied by the plastic carrier 42. The elastomer 40, which is preferably of rubber, Includes a thin line of conductive material in order to provide the necessary electrical contact. The resilient element 40 is not limited to this type of elastomer, but other materials having similar qualities may just as well be provided. Metallic springs are not that good to use, since they can scratch the surface of the ITO layer. Also here the carrier 42 is attached to the display window. Alternatively the display window can be formed such that it acts as the carrier for the antenna.

It should be realised the two described solutions can be provided for both the contact pads of the second antenna element.

Figure 8:
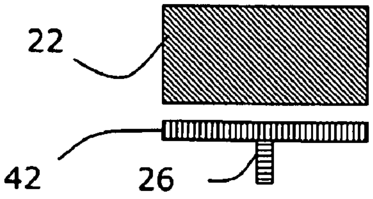
FIG. 8 shows a top view of the first antenna element together with a capacitive coupling element according to a third embodiment of the present invention.

As an alternative the connection between pad and antenna element 22 can be provided using capacitive coupling, which is shown in FIG. 8, which shows a top view of the first antenna element 22 according to a third embodiment of the present invention. Here a capacitive coupling element in the form of a metallic strip 42 stretches along the whole side of the antenna element 22 in the form of the ITO layer. The capacitive coupling element 42 is connected to the contact pin 26, which in turn is connected to the circuit on the printed circuit board that is driving the antenna. The driving of the antenna element 22 is here provided in such a way that the capacitive coupling between antenna element 22 and strip 42 is used. With this solution the contacting problem is completely avoided. The capacitance can be selected by using a suitable dielectric material between contact pad and antenna element.

The present invention was above described as being provided on a window provided in the cover of a portable communication device.

It should be realised that the present invention is not limited to this type of environment. It can just as well be provided on another transparent element like a regular house window or the window or windshield of a car and then be connected to for instance a portable communication device using a wire. Such an antenna can also be used for connection to other devices, like for instance a television set.

The antenna structure according to the invention has several advantages. It saves space within the phone, which can be used for other purposes, like more components and other units or for further size reduction of the phone. Because of the provision of antenna elements in a window covering a display, it is possible to provide a shield layer in the display, such that radio frequency absorption in the display is avoided. The invention furthermore allows information presented to be viewed without the antenna elements blocking it. The different contacting solutions that are proposed all solve the problem faced associated with electrically contacting an antenna element with a printed circuit board.

The present invention can be varied in more ways than the ones described. It is possible to include more or fewer antenna elements. The shapes of the antenna elements can also be varied, for instance in order to provide multiband capabilities. The materials chosen can also be varied. Thus the present invention is only to be limited by the following claims.

The invention claimed is:

1. A portable communication device comprising:

a cover covering a display having a display surface and a front polarizing layer;

a transparent non-conductive display window made of a plastic material and provided in the cover of the device, covering the display surface of the display and being separated from the display by a gap;

an antenna having at least one radiating antenna element, wherein the radiating antenna element is provided as a transparent conductive layer provided on the display window; and a thin transparent conductive shield in the front polarizing layer that is a part of the display and provided on the display surface, the thin transparent conductive shield being adjacent the gap of empty space separating the antenna on the display window and the display surface for avoiding electromagnetic radiation absorption by the display wherein the shield is made of a transparent conductive material.

2. A portable communication device according to claim 1, wherein the radiating antenna element is provided as a patch on at least a part of the window.

3. A portable communication device according to claim 1, wherein at least one radiating antenna element is a PIFA antenna.

4. A portable communication device according to claim 1, wherein at least one radiating antenna element is a patch antenna.

5. A portable communication device according to claim 1, wherein the antenna comprises at least one contact surface to which one radiating antenna element is electrically connected.

6. A portable communication device according to claim 5, wherein the radiating antenna element is connected to the contact surface via an insulating binding agent comprising conductive particles.

7. A portable communication device according to claim 5, wherein the radiating antenna element is connected to the contact surface via a resilient element and at least one force applying element arranged to press the antenna element and the contact surface against each other.

8. A portable communication device according to claim 1, wherein the antenna comprises a capacitive coupling element for obtaining capacitive coupling of the radiating antenna element to a feeding circuit.

9. A portable communication device according to claim 1, wherein the device is a mobile phone.

10. A portable communication device according to claim 1, wherein the gap comprises a void.

11. A portable communication device according to claim 1, wherein the conductive shield is between the display and the antenna.

* * * * *